United States Patent [19]

Broughton

[11] 4,322,815
[45] Mar. 30, 1982

[54] HIERARCHICAL DATA STORAGE SYSTEM
[75] Inventor: Philip Broughton, Bolton, England
[73] Assignee: International Computers Limited, London, England
[21] Appl. No.: 141,784
[22] Filed: Apr. 21, 1980
[30] Foreign Application Priority Data
May 9, 1979 [GB] United Kingdom ............... 16021/79
[51] Int. Cl.³ .......................... G11C 9/06; G06F 13/00
[52] U.S. Cl. ...................................... 364/900; 365/230
[58] Field of Search ... 364/200 MS File, 900 MS File; 365/230

[56] References Cited
U.S. PATENT DOCUMENTS

| | | | |
|---|---|---|---|
| 3,292,152 | 12/1966 | Barton | 364/200 |
| 3,868,644 | 2/1975 | Healey et al. | 364/200 |
| 3,878,513 | 4/1975 | Werner | 364/200 |
| 3,986,171 | 10/1976 | Spoelder | 364/200 |
| 4,195,340 | 3/1980 | Joyce | 364/200 |

*Primary Examiner*—Gareth D. Shaw
*Assistant Examiner*—Eddie P. Chan
*Attorney, Agent, or Firm*—Lee, Smith & Jager

[57] ABSTRACT

A cache store is provided in conjunction with a main store. Each location of the cache has a changed bit. A list is maintained of the addresses of those locations in the cache store which have been modified. When the list becomes full, the entry at the head of the list is read out and the corresponding data item is transferred from the cache to the main store. Thus, there are never more than a limited number of items in the cache awaiting transfer. To clear the cache of all modified items, each entry in the list is read out in turn and the corresponding items are transferred to the main store. The system reduces the amount of traffic between the cache and the main store and hence improves efficiency.

7 Claims, 4 Drawing Figures

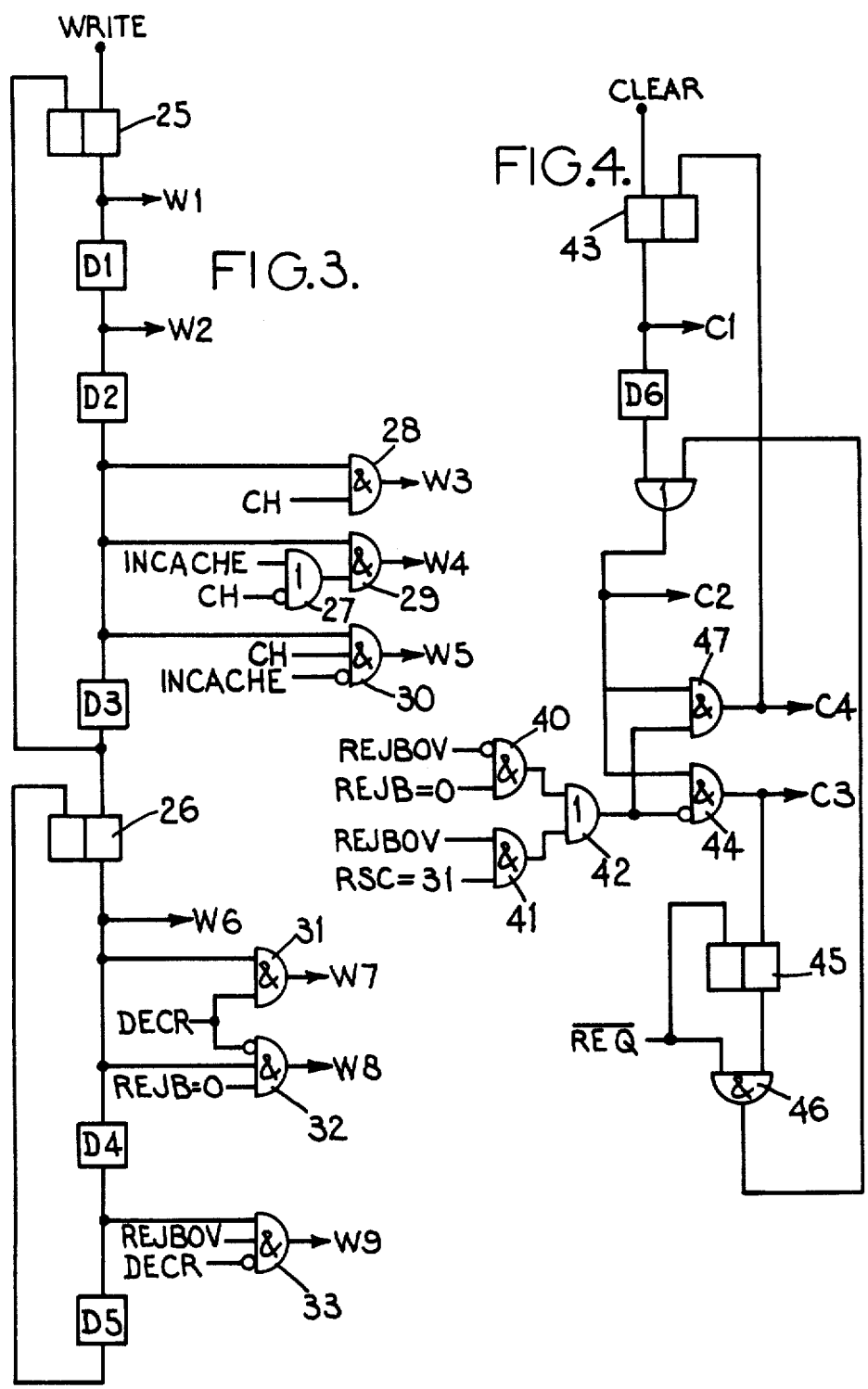

HIERARCHICAL DATA STORAGE SYSTEM

BACKGROUND OF THE INVENTION

This invention relates to hierarchical data storage systems.

A hierarchical data storage system basically comprises a first, relatively large store, in conjunction with a second store which is smaller but faster than the first store. The second store is arranged to hold copies of data items which have recently been used and therefore have a high probability of being required again in the near future. As a result, a high proportion of data retrieval requests can be satisfied simply by reading the data from the second store, without the need for access to the first store. In this way, the system can achieve a fast average data access speed, ideally approaching that of the second store, but with a low average cost per bit of storage, approaching that of the first store.

In such a system, when it is desired to modify a particular data item, a check is first made to find out whether that item is currently resident in the second store and, if so, a write operation is performed in the second store so as to make the required modification. It is then necessary at some time to perform a corresponding write operation in the first store, so as to ensure that the first store is kept up-to-date. Various strategies for performing the writing of data to the first store have been proposed, as follows:

(a) Whenever a data item is written into the second store, it is also immediately written into the first store. This is the simplest strategy, but has the disadvantage that it results in the maximum number of accesses to the first store. Moreover, modification of a data item is a slow process, since it always involves access to the first store.

(b) When a data item is written into the second store, it is not immediately written into the first store; it is written to the first store only when the item is about to be deleted from the second store. The advantage of this strategy is that the number of accesses to the first store is minimised since, if a data item is modified several times while it is resident in the second store, only the last of the modified values is actually written into the first store. The disadvantage, however, is that deletion of a data item is a slow process, since it involves access to the first store. This is particularly evident when it is desired to clear the second store completely, which may involve a large number of accesses to the first store and hence take a relatively long time.

(c) British Patent Specification No. 1233117, as well as describing strategies (a) and (b) above, also describes another strategy in which, when a data item is written into the second store, a "changed" bit is set for that item, but the item is not immediately written into the first store. Instead, when the first store has free time available, a low priority request is made for access to the second store. When this request is granted, the second store is searched for items whose changed bits have been set, and these items are transferred to the first store. Searching continues until all the second store has been searched, or until it is interrupted by a higher priority request for use of the second store. This method removes some of the disadvantages of (a) and (b) above, but requires additional hardware for resolving different priority requests. Moreover, the searching of the second store could introduce a further delay.

The object of the present invention is to alleviate the problems of (a) and (b) above, without the necessity for priority resolution hardware and without the need for searching the second store for changed items.

SUMMARY OF THE INVENTION

According to the invention, a hierarchical data storage system is provided, comprising a first store and a second store having a faster access time but a smaller number of data locations than the first store, each location of the second store having a changed bit indicating whether or not the data in that location has been modified, characterised by a further store, organised as a queue of entries, wherein when data is written into one of the locations of the second store, if the changed bit of that location is not already set, the address of the location is placed at the end of the queue in the further store and the changed bit of that location is set, and wherein when the further store becomes full, the entry at the head of the queue is automatically read out and is used to address the second store, and the data in the addressed location of the second store is then transferred to the first store and the changed bit of that location is reset.

BRIEF DESCRIPTION OF THE DRAWINGS

One embodiment of the invention will now be described by way of example with reference to the accompanying drawings of which FIGS. 3 and 4 show control logic for controlling the operation of the cache store.

OVERVIEW OF THE SYSTEM

Figures 1, 2:
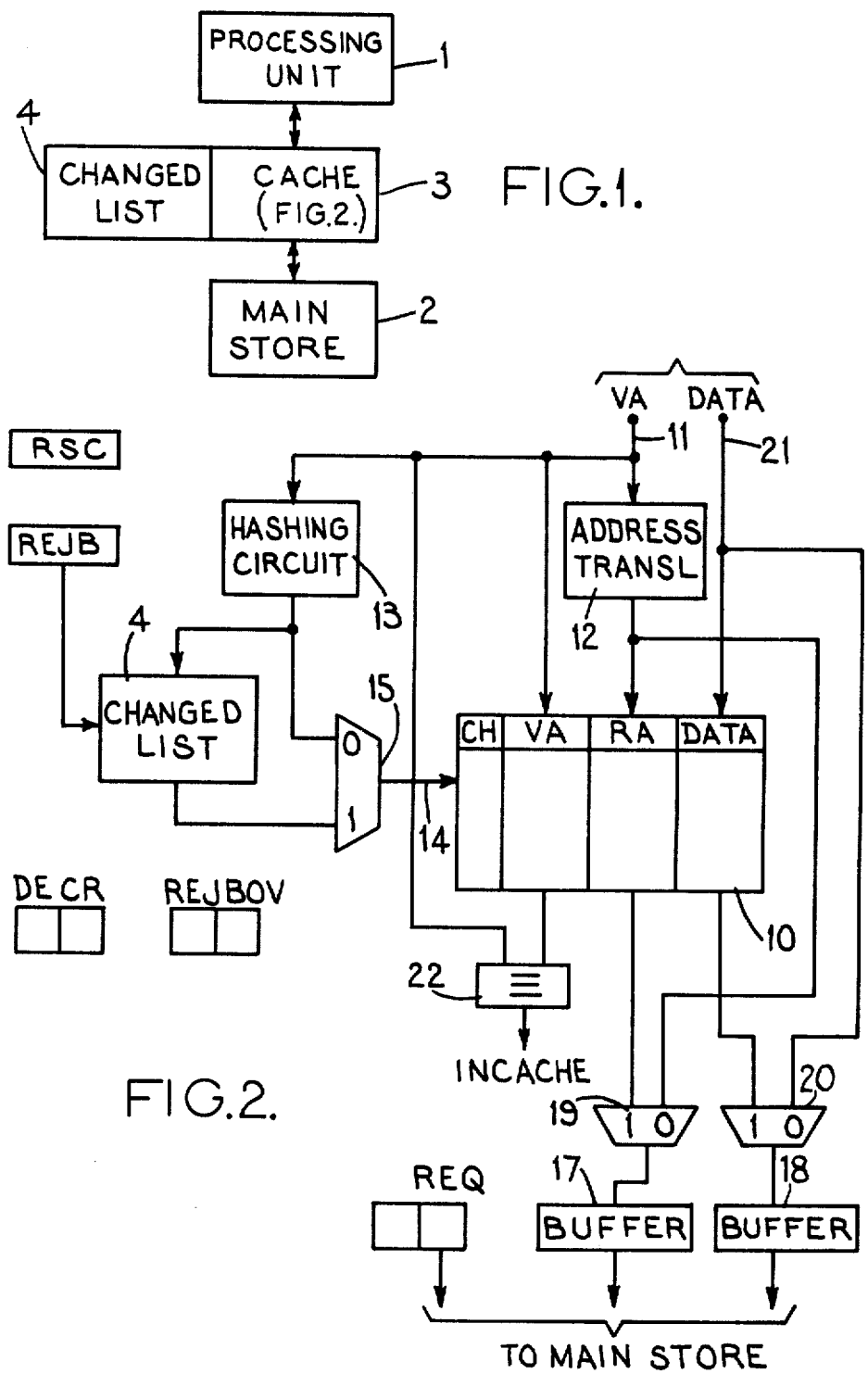
FIG. 1 is a schematic block diagram of a data processing system including a cache store.
FIG. 2 shows the cache store in more detail.

Referring to FIG. 1, the system comprises a data processing unit 1, a main store 2, and a cache store 3 situated between the processing unit and the main store.

The main store 2 is a relatively large store holding, for example, 64K data items. (These items may for example be words, or blocks of words). Every data item has a real address specifying its location within the main store.

The cache store 3 is substantially smaller than the main store, but has a substantially faster access time. In the present embodiment, the cache is capable of holding 1K = 1024 data items. Each item has a "changed" bit, indicating whether or not it has been modified.

Whenever the processing unit 1 requires to read a particular data item, it applies the virtual address of that item to the cache store 3 and issues a READ command. A check is then made to find out whether that item is currently resident in the cache and, if it is, the item is read out without any need for a main store access. However, if the item is not in the cache, the virtual address is translated into the real address of the item and a main store access is initiated so as to read the item from the main store and an attempt is made to place it in the cache. However, if the location into which the item would be placed is already occupied by another item whose changed bit is set, this location cannot be overwritten since it contains the only up-to-date copy of that other item. Hence, the newly retrieved data item bypasses the cache to the processing unit and is not retained by the cache.

The mechanism for controlling the READ operation forms no part of the present invention and since such mechanisms are well known in the art it will not be described in any further detail.

When the processing unit requires to modify a data item, it applies the virtual address of the item to the cache 3 along with the new value of the data, and issues a WRITE command. An attempt is then made to write the new value into the cache. A check is first made to find out whether the location into which the modified item would be placed is already occupied by the existing value of the same item. If so, the new value is written into the location, overwriting the existing value, and the changed bit is set (if it is not already set). Likewise, if the location is occupied by a different item whose changed bit is not set, the modified item is written into the location, overwriting the existing item, and then the changed bit is set. However, if the location is occupied by a different item whose changed bit is set, that item cannot be overwritten, and so the modified item must be transferred immediately to the main store, without being entered into the cache.

Associated with the cache 3 is a random access memory 4, referred to as the changed list. The changed list has 32 locations and entries in the changed list are effectively organised as a queue. Whenever a data item is modified in the cache, the cache address of that item is inserted into the changed list at the tail of the queue (unless the changed bit of that item is already set, indicating that the item has already been modified and hence the cache address of that item is already in the queue). When the changed list becomes full, the entry at the head of the queue is read out (thus reducing the number of entries remaining in the queue to 31) and is used to address the cache. The addressed item and its real address are then read out of the cache and a main store access is initiated, so as to transfer the item to the main store. The changed bit of the item is reset.

It can be seen that there may be up to 31 items in the cache awaiting transfer to the main store. Thus, up to 31 items can be written into the cache without any main store access being required. Moreover, any further modification to these items while they are waiting to be transferred does not result in any additional main store access, since only the latest modified value actually needs to be transferred. Therefore, it can be seen that the changed list helps significantly to reduce the number of main store accesses.

It may be necessary from time to time to clear all the modified items from the cache. This is done by executing a CLEAR command, as follows. Each entry in the changed list is read out in turn and used to address the cache. The addressed data item is then transferred to the main store and its changed bit in the cache is reset. Since there are never more than 31 items awaiting transfer, this command will not take an excessively long time to complete. Moreover, since the cache addresses of the modified items are all readily available in the changed list, it is not necessary to search the cache for the modified items.

DETAILED DESCRIPTION OF CACHE

Referring now to FIG. 2, the cache store comprises a random access memory 10 having 1024 individually addressable locations. Each location contains the following:

(i) a data item (DATA).
(ii) the real address (RA) of the item.
(iii) the virtual address (VA) of the item.
(iv) the changed bit (CH) of the item.

The input virtual address from the processing unit (on path 11) is applied to an address translation unit 12 which translates it into the corresponding real address, which is applied to the input of the RA section of the cache. The virtual address is also applied to the VA section of the cache, and to the input of a hashing circuit 13. The hashing circuit performs a pseudo-random transformation on the virtual address to produce a 10-bit hash code for addressing the cache. The hashing circuit may, for example, consist of a set of ten exclusive-OR gates, each of which receives two bits of the virtual address.

The address input of the cache is connected to a multiplexer 15, which selects either the output of the hashing circuit 13 or the output of the changed list 4. The output of the hashing circuit is also applied to the data input of the changed list 4. The changed list is addressed by a 5-bit cyclic counter REJB.

The system also includes an address buffer 17 and a data buffer 18. The input of the address buffer is connected to the output of a multiplexer 19 which selects either the output of the address translation unit 12, or the output of the RA section of the cache 11. The input of the data buffer 18 is connected to the output of a multiplexer 20 whose inputs are connected to an input data path 21, which receives data from the processing unit, and to the output of the DATA section of the cache. The data path 21 is also connected to the input of the DATA section of the cache.

The output of the VA section of the cache is applied to a comparator 22 where it is compared with the input virtual address received on path 11. The output of this comparator provides a signal INCACHE which is true if the input virtual address matches the output from the cache. This signal therefore indicates that the data item whose virtual address is supplied on path 11 is currently resident in the cache.

The system also includes three bistables referred to as the request flag REQ, the decrement flag DECR, and the overflow flag REJBOV, the purpose of which will be explained below.

OPERATION AND CONTROL

Referring now to FIG. 3, this shows the logic circuit which controls the execution of a WRITE command. The logic circuit comprises two bistables 25, 26 which respectively define two control states. When a WRITE command is received, bistable 25 is set, placing the logic in the first control state.

In the first control state, a signal W1 is produced, which sets the multiplexers 15, 19 and 20 so that each selects its input labelled "0" in FIG. 2. Thus, the address input of the cache 10 receives the hash code from the hashing circuit 13, the address buffer 17 receives the real address from the address translation unit 12, and the data buffer receives the modified data from path 21. The signal W1 also clocks the changed list 4, causing the hash code to be written into the location currently addressed by the counter REJB. The signal W1 also resets the decrement flag DECR.

After a delay (D1) sufficient to allow the writing into the changed list to be completed, another signal W2 is produced. This signal increments the counter REJB by unity, so that it now points to the next location following the one which has just been written into. (Counter REJB is initially set to zero).

A further delay (D2) now follows, to allow the addressing of the cache 10 to be completed and the contents of the addressed location to be read out. After this delay, the signal INCACHE is available from comparator 22, to indicate whether the data item in question is currently resident in the cache. The changed bit CH of the addressed item is also available.

It can be seen that if the changed bit is already set (CH=1), the writing of the hash code into the changed list and the incrementing of the counter REJB was unnecessary and must be reversed. This condition enables an AND gate 28 to produce a signal W3. This signal sets the decrement flag DECR which, as will be described, causes the counter REJB to be decremented during the second control state.

If the item is resident in the cache (INCACHE=1), or if the changed bit is not set (CH=0), an OR gate 27 is enabled, which in turn enables an AND gate 29, producing a signal W4. This signal clocks the VA, RA and DATA portions of the cache 10, causing the virtual address VA, real address from the address translation unit and the modified data from path 21 to be written into the currently addressed location of the cache. The signal W4 also sets the changed bit of the location (if it is not already set). If on the other hand the item is not resident in the cache (INCACHE=0) and the changed bit is already set (CH=1), an AND gate 30 is enabled, producing a signal W5. This signal clocks the buffers 17 and 18, so as to write the modified data from path 21 into the data buffer 18 and the corresponding real address into the address buffer 17. The signal W5 also sets the request flag REQ. This initiates transfer of the contents of the buffer 18 into the location of the main store specified by the contents of the address buffer 17.

After a further delay (D3), the bistable 25 is reset, terminating the first control state, and the bistable 26 is set, initiating the second control state. In this second state, a signal W6 is produced, which sets the multiplexers 15, 19 and 20 so that they now select the inputs labelled "1" in FIG. 2.

If the decrement flag DECR is set, an AND gate 31 is now enabled, producing a signal W7 which decrements the counter REJB by unity. If, on the other hand, the decrement flag DECR is not set and the counter REJB contains the value zero, another AND gate 32 is enabled, producing a signal W8. This signal indicates that the counter REJB has performed at least one full cycle and has been incremented to zero. This means that the queue of entries in the changed list is now full. The signal W8 sets the overflow flag REJBOV so as to remember this.

A delay (D4) now follows, allowing the cache to be addressed, via multiplexer 15, by the output of the changed list. After this delay has elapsed, if the overflow flag REJBOV is set and the decrement flag DECR is not set, an AND gate 33 is enabled, producing a signal W9. This signal indicates that there are currently 32 modified data items in the cache and hence one of these items must be transferred to the main store to reduce the number to 31, which is the maximum number of modified items allowed to remain in the cache awaiting transfer. The signal W9 therefore clocks the buffers 17 and 18, causing the currently addressed data item in the cache to be written into the data buffer 18 and its real address to be written into the address buffer 17. The signal W9 also resets the changed bit of the currently addressed data item, and sets the request flag REQ, initiating the transfer of the data item to the main store.

After a further delay (D5), the bistable 26 is reset, terminating the second control state. In the case where the request flag REQ has been set, it remains set until the data transfer is completed, whereupon it is reset by a signal from the main store.

Referring now to FIG. 4, this shows the logic for controlling execution of a CLEAR command. The execution consists of a number of cycles. In each cycle, the currently addressed location of the changed list is read out and used to address the cache, and the addressed item is then transferred to the main store. The counter REJB is decremented and the cycle is then repeated until all modified items have been transferred. The number of cycles to be performed depends on whether the overflow flag REJBOV has been set.

If REJBOV has not been set, the counter REJB has not yet completed a full counting cycle. Thus, the number of modified data items in the cache is specified by the contents of the counter REJB. Hence, the condition for terminating the CLEAR command in this case is REJB=0. This is detected by an AND gate 40.

Alternatively, if REJBOV has been set, the counter REJB has completed at least one full counting cycle. Hence, there must be 31 modified data items in the cache, and the transfer cycle must be performed 31 times. This is controlled by means of another 5-bit counter RSC which is initially set to 1 and is incremented each time a data item is transferred. The condition for terminating the CLEAR command in this case is RSC=31. This condition is detected by an AND gate 41.

The outputs of the two AND gates 40, 41 are combined in an OR gate 42 to produce a signal which indicates that all the data items have been transferred.

When a CLEAR command is received, a bistable 43 is set. This produces a signal C1 which causes the multiplexers 15, 19 and 20 to be switched so as to select the inputs labelled "1". The signal C1 also resets the counter RSC to its initial value "1".

After a delay (D6) allowing the cache to be addressed by the output of the changed list, a signal C2 is produced. This signal clocks the buffers 17 and 18 so as to write the currently addressed data item from the cache into the data buffer 18 and its real address into the address buffer 17. The signal C2 also resets the changed bit in the currently addressed location, and sets the request flag REQ, initiating the transfer of the data item to the main store.

Now, if the output of the OR gate 42 is zero (indicating that the required number of cycles has not yet been performed) an AND gate 44 is enabled, producing a signal C3. This signal decrements the counter REJB, increments the counter RSC, and sets a bistable 45.

The circuit now waits for the transfer of the data item to the main store to be completed, and the request flag REQ to be reset. When this happens, an AND gate 46 is enabled, and the bistable 45 is reset. Enabling of the AND gate 46 results in the signal C2 being produced again, initiating the transfer of the next data item.

When the transfer of the last data item has been initiated, the output of the OR gate will be equal to "1". This enables an AND gate 47, producing a signal C4, which resets the bistable 43. The signal C4 also resets the counter REJB to zero.

I claim:

1. A hierarchical data storage system comprising (a) a first store;

(b) a second store having a faster access time but a smaller number of data locations than the first store, each location of the second store having a changed bit associated with it; and (c) addressing means for producing an address signal for addressing the second store to select one of the locations therein and for writing data into the selected location, thereby modifying the contents of that location; wherein the improvement comprises:

(d) a further store organised as a queue of entries;

(e) means for testing the changed bit of the location selected by said addressing means and, if the changed bit is not set, writing data into the selected location and writing said address signal into the further store at the end of said queue;

(f) counting means for counting the number of entries in said queue and producing an indication signal when the queue is full;

(g) means responsive to said indication signal for automatically reading out the address signal at the head of said queue; and (h) means for utilising the address signal read out from the head of said queue for addressing the second store, to read out a previously modified item of data for transfer to the first store.

2. A system according to claim 1 wherein the number of entries in the further store is substantially smaller than the number of locations in the second store.

3. A system according to claim 1 further including means for automatically reading out each entry in turn from the queue and using those entries to address the second store, so as to transfer all the modified data items currently in the second store to the first store.

4. A system according to claim 1 said addressing means further including a hashing circuit for performing a pseudo-random transformation on an input virtual address to produce a hash address, and a multiplexer for selecting either the hash address or the output of the further store for addressing the second store.

5. A system according to claim 4 further including means operative wherever data is written into a location of the second store for writing said input virtual address into the same location alongside the data.

6. A system according to claim 5 further including means for comparing the input virtual address with the virtual address stored in a location of the second store.

7. A system according to claim 5 further including an address translation unit for translating the input virtual address into a real address, and means operative whenever data is written into a location of the second store for writing said real address into the same location alongside the data and the input virtual address.

* * * * *